US008218685B2

(12) United States Patent
Campeau

(10) Patent No.: US 8,218,685 B2
(45) Date of Patent: Jul. 10, 2012

(54) DATA SLICER THRESHOLD ADJUSTMENT FOR DISPARITY CONTROLLED SIGNALS

(75) Inventor: Sean Campeau, Kanata (CA)

(73) Assignee: Applied Micro Circuits Corporation, San Diego, CA (US)

( * ) Notice: Subject to any disclaimer, the term of this patent is extended or adjusted under 35 U.S.C. 154(b) by 659 days.

(21) Appl. No.: 12/414,480

(22) Filed: Mar. 30, 2009

(65) Prior Publication Data

US 2010/0246722 A1 Sep. 30, 2010

(51) Int. Cl.
*H03K 9/00* (2006.01)
(52) U.S. Cl. .............. 375/316; 348/465; 369/59.17
(58) Field of Classification Search .............. 375/232, 375/233, 260, 316, 359, 360; 348/465, 468; 369/59.17, 124.09; 341/51, 58, 59
See application file for complete search history.

(56) References Cited

U.S. PATENT DOCUMENTS

| 5,517,249 | A * | 5/1996 | Rodriguez-Cavazos et al. | 348/465 |
|---|---|---|---|---|
| 5,666,167 | A * | 9/1997 | Tults | 348/465 |
| 7,065,026 | B2 * | 6/2006 | Hung et al. | 369/59.17 |
| 7,142,133 | B2 * | 11/2006 | Shim et al. | 341/51 |
| 7,317,489 | B2 * | 1/2008 | Thaly et al. | 348/465 |
| 7,796,193 | B2 * | 9/2010 | Chang et al. | 348/465 |
| 2004/0086276 | A1 * | 5/2004 | Lenosky et al. | 398/39 |

* cited by examiner

*Primary Examiner* — David Ometz
*Assistant Examiner* — Fitwi Hailegiorgis
(74) *Attorney, Agent, or Firm* — Law Office of Gerald Maliszewski; Gerald Maliszewski

(57) ABSTRACT

A system and method are provided for using disparity measurements to control the adjustment of a data slicer threshold. The method receives a serial stream of pseudorandom digital data signals having an average DC value, and compares data signal amplitudes to a slicer threshold value. In response to the slicer threshold value comparison, data signal "1" and "0" values are determined. A first sum of determined "1" values is created, and a second sum of determined "0" values is created. The slicer threshold value is adjusted in response to the comparison of the first and second sums. More explicitly, the slicer threshold value is adjusted to make "1" values more likely in response to the second sum being larger than the first sum. Alternately, the slicer threshold value is adjusted to make "0" values more likely in response to the second sum being smaller than the first sum.

17 Claims, 3 Drawing Sheets

DATA SLICER THRESHOLD ADJUSTMENT FOR DISPARITY CONTROLLED SIGNALS

BACKGROUND OF THE INVENTION

1. Field of the Invention

This invention generally relates to digital communications and, more particularly, to a system and method for adjusting a data slicer threshold in disparity controlled signals.

2. Description of the Related Art

FIG. 1 is a diagram illustrating a signal recovered from a binary symmetric, non-dispersive channel in the presence of symmetric noise (prior art). Conventionally, the signal is filtered with a transfer function matched to the signaling waveform (in this case a one unit step) and thresholded at the voltage level most likely to yield the transmitted bit. To recover the transmitted information, a hard decision must he made as to the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. For each of these cases the likelihood of error in determining a bit value can be minimized if a different thresholds are used for different bit combinations.

FIG. 2 is a diagram illustrating received waveforms that are distorted in response to the inter-symbol interference resulting from energy dispersion (prior art). The value at the output of the filter varies with each bit, and is essentially a random process, due to the non-deterministic nature of the information, and pseudorandom scrambling that is often used in the transmission of NRZ data streams. However, received bits can be characterized with probability density functions, as shown. Without knowledge of the neighboring bits, a single probability density function can be extracted that represents the random behavior of the input over all conditions and all sequences. However, conditional probability density functions can be defined for the three cases mentioned above. Namely, probability density functions can be defined for the eases where there are zero neighboring ones, only one neighboring one, and two neighboring ones.

If the bit value decision process could be made using the knowledge of the decision made on the preceding decoded bit, and with a measurement of a subsequent decoded bit, then the corresponding probability density function could be selected to make a more accurate decision on the current bit decision. However, the cost and accuracy of conventional analog-to-digital (A/D) conversion circuits make such a solution impractical.

The degree of dispersion exhibited by a channel, and hence the separation of the conditional probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

The above-mentioned problems, in separating the conditional probability density functions of the three bit sequence scenarios, are exasperated when the noise distribution is not symmetric. That is, the energy distributions for "1" bits and "0" bits are different.

One solution to the problem of inter-symbol interference (ISI) is the use of Running Disparity. IEEE 802.3 describes Running Disparity as part of a 1 gigabit per second (Ghps) Ethernet system. ANSI and T11 standards for FibreChannel also use Running Disparity. For example, 8b/10b encoding maintains, a DC balance by keeping the number of 1s and 0s that are transmitted approximately equal, 5b/6b and 3b/4b encoding is based upon a similar concept. The problem is that while the message signal is DC balanced, the channel may introduce an offset which can result in increased bit error rate. Thus, while the use of Running Disparity is helpful, it does not ensure that optimal threshold value is being used.

Some current solutions act to improve the channel response by reducing its length, improving its quality at the receiver, or improving the signal quality at transmission (e.g. pulse shaping). Other solutions add forward error correction (FEC) to the data. All of these solutions involve tradeoffs or a significant increase in signal processing.

It would be advantageous if a data slicer threshold could be adaptively controlled to compensate for changes in a received channel.

SUMMARY OF THE INVENTION

Disclosed herein is a means to optimize the slicer threshold level in the Data Recovery circuit of a Disparity Controlled signal, such as 8B10B encoded Ethernet or FibreChannel. Electrical and optical links that are 8B10B encoded use disparity to DC balance the signal. When interference is added to the channel, a DC offset can be introduced that causes the data slicer to slice at a less optimal level, which results in an increased Bit Error Rate (BER) for the link. By controlling the data slicer threshold with a control system that monitors disparity, the threshold can be optimized for individual links during operation, reducing BER and/or extending the reach of the link.

Accordingly, a method is provided, for using disparity measurements to control the adjustment of a data slicer threshold. The method receives a serial stream of pseudorandom digital data signals having an average DC value, and compares data signal amplitudes to a slicer threshold value. In response to the slicer threshold value comparison, data signal "1" and "0" values are determined. A first sum of determined "1" values is created, and a second sum of determined "0" values is created. The slicer threshold value is adjusted in response to the comparison of the first and second sums. More explicitly, the slicer threshold value is adjusted to make the determination of "1" values more likely in response to the second sum being larger than the first sum. Alternately, the slicer threshold value is adjusted to make the determination of "0" values more likely in response to the second sum being smaller than the first sum.

Additional details of the above-described method, and a receiver with a system for controlling the adjustment of a data slicer threshold are provided below.

DETAILED DESCRIPTION OF THE PREFERRED EMBODIMENTS

Figure 1:
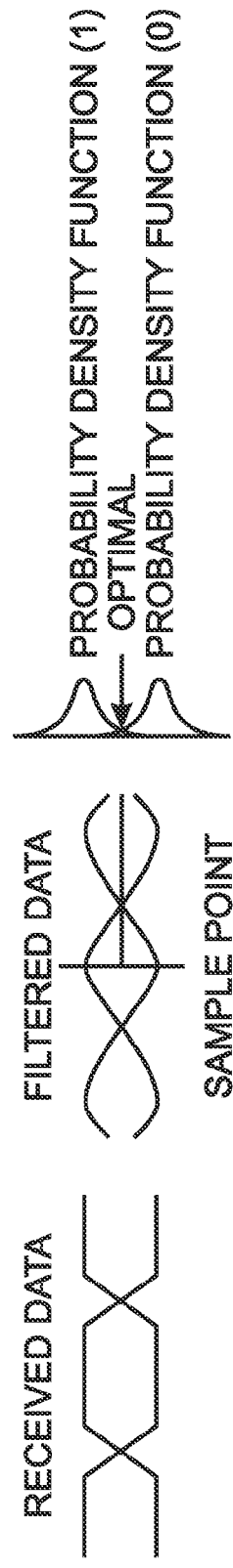
FIG. 1 is a diagram illustrating a signal recovered from a binary symmetric, non-dispersive channel in the presence of symmetric noise (prior art).
Figure 2:
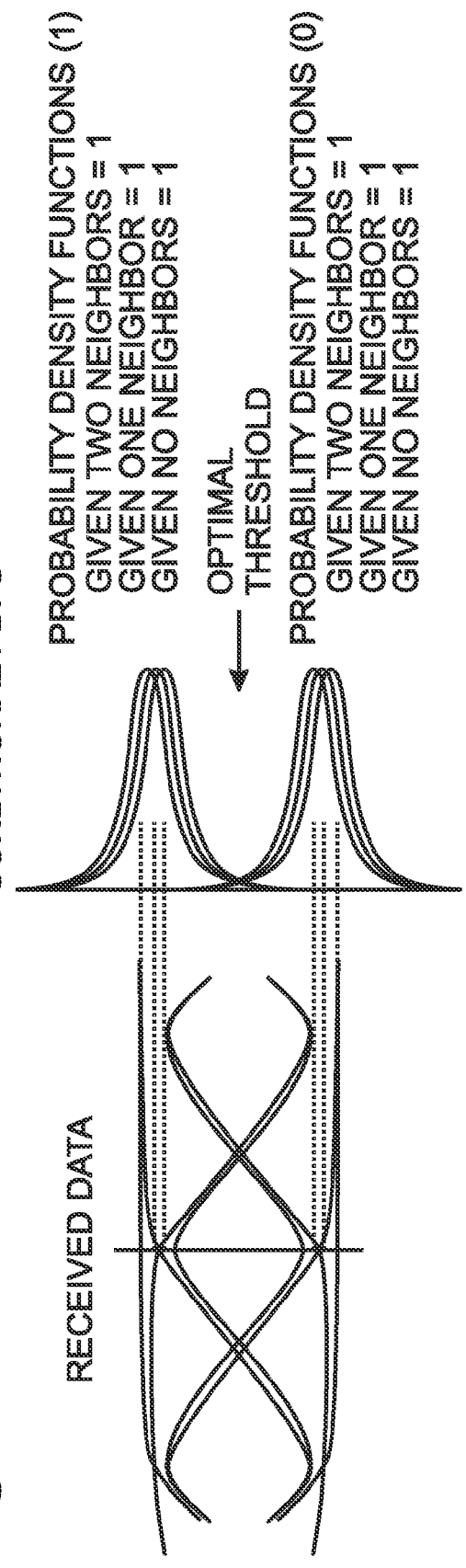
FIG. 2 is a diagram illustrating received waveforms that are distorted in response to the inter-symbol interference resulting from energy dispersion (prior art).
Figure 3:
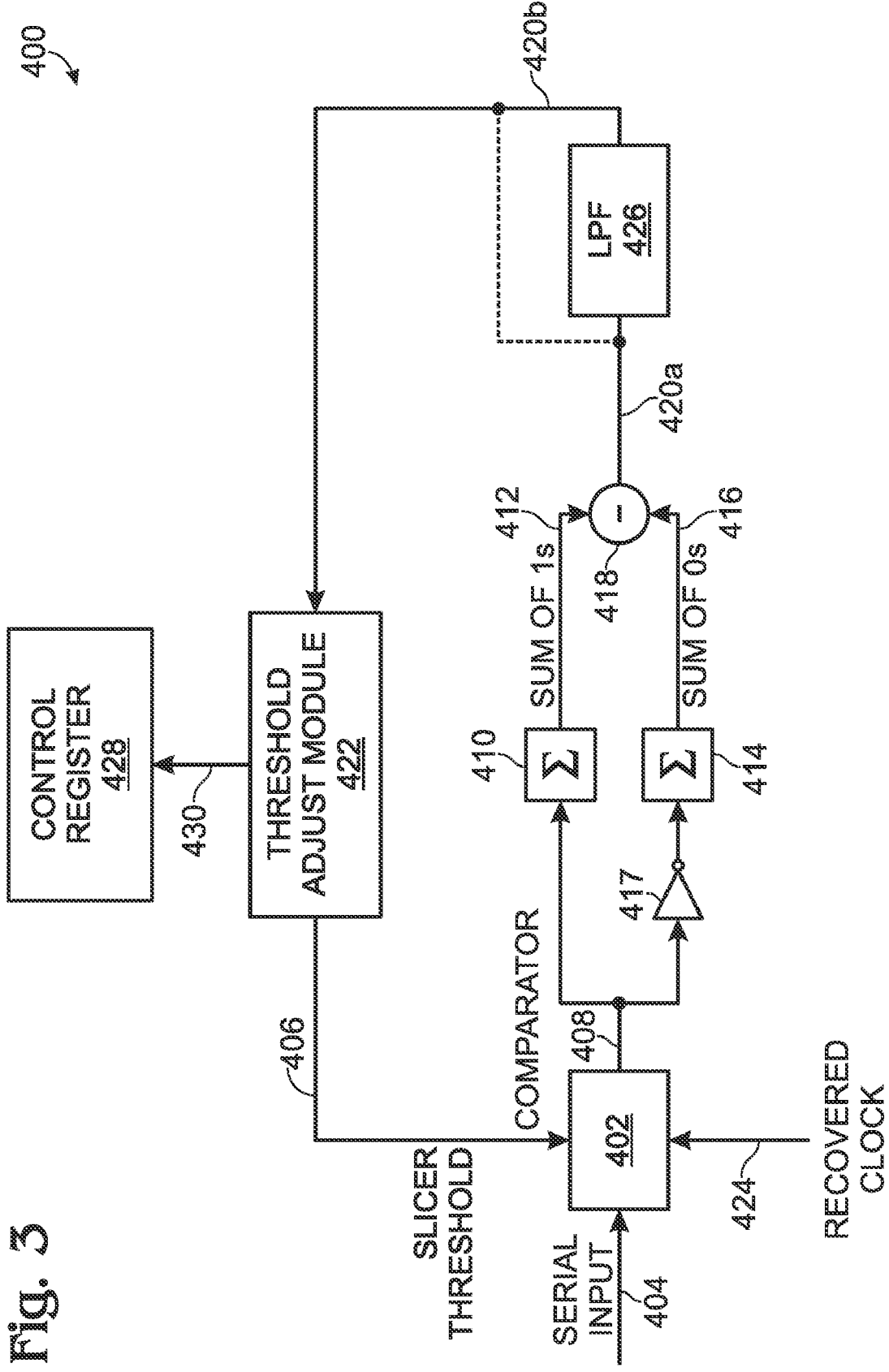
FIG. 3 is a schematic block diagram of a communications receiver with a disparity measurement system for controlling the adjustment of a data slicer threshold.

FIG. 3 is a schematic block diagram of a communications receiver with a disparity measurement system for controlling the adjustment of a data slicer threshold. The system 400 comprises a comparator 402 having an input on line 404 for receiving a serial stream of pseudorandom digital data signals having an average DC value, and an input on line 406 to accept a slicer threshold value. The comparator 400 has an output on line 408 to supply data signal "1" and "0" values, in response to comparing data signal amplitudes to the slicer threshold value. A first summing circuit 410 has an input connected to the comparator output on line 408, and an output on line 412 to supply a first sum of determined "1" values. A second summing circuit 414 has an input connected, to the comparator output on line 403, and an output on line 416 to supply a second, sum of determined "0" values. As shown, the first and second summing circuits are identical, but an inverter 417 has been interposed between the comparator and the second summing circuit 414 for the collection of "0" value data.

A subtracter 418 has inputs connected to the first and second summing circuit outputs on lines 412 and 416, respectively, and an output on line 420 to supply a difference between the first and second sums. A threshold adjust module 422 has an input on line 420 to accept the difference and an output on line 406 to supply the slicer threshold value responsive to the difference.

The subtracter 418 supplies a first difference in response to the second sum being larger than the first sum. In that case, the threshold adjust module 422 accepts the first difference on line 420 and adjusts the slicer threshold value on line 406 to make the determination of "1" values more likely. For example, the slicer threshold might be lowered to increases the likelihood of an input signal being determined as a "1" value. Alternately, the subtracter 418 supplies a second difference in response to the first sum being larger than the second sum. Then, the threshold adjust module 422 accepts the second difference and adjusts the slicer threshold value on line 406 to make the determination of "0" values more likely.

In one aspect, the subtracter 418 supplies a difference value, which is the difference between the first sum and to the second sum after the determination of each data value by the comparator. Typically, the comparator 402 has a clock input on line 424 to accept clock pulses. The comparator 402 times the comparison of data signal amplitudes to the threshold value in response to the clock pulses. In this case, the difference value is updated every clock cycle.

In another aspect, the threshold adjust module 422 accumulates the difference values over a predetermined unit of time, creating an accumulated value, and adjusts the slicer threshold value in response to the accumulated value. For example, the predetermined unit of time may be a first number of clock cycles.

In one aspect, the system 400 further comprises a low pass filter (LPF) 426 interposed between the output of the subtracter 418 on line 420*a* and the input of the threshold adjust module 422 on line 420*b*. However, the low pass filter need not always he included, as indicated by the dotted line bypassing the filter.

In another aspect, the system 400 further comprises a control register 428 for storing a DC input target threshold (DC threshold). For example, the DC threshold may be a two's-complement signed value. In this aspect, the threshold adjust module 422 has an interface on line 430 to access the DC threshold from the control register 428. The threshold adjust module 422 compares the accumulated difference value to the DC threshold and changes the slicer threshold value on line 406 to compensate for a mismatch between the accumulated difference voltage and DC threshold. For example, the threshold adjust circuit 422 may change the slicer threshold value once every unit of time (i.e., the first number of clock cycles). Note: the DC threshold may be preset by the user, or be a value selected while the receiver is operational. The DC threshold may be used to prevent the slicer threshold from wandering away from an expected optimal value.

Functional Description

The system depicted in FIG. 3 operates in a receiver to accumulate the difference between the number of received 1s and the number of received 0s, This difference should remain at 0 over a period of time in a disparity controlled channel. If the accumulated difference moves beyond a configured watermark (DC threshold), then the data slicer threshold is tuned accordingly to eliminate the offset. To obtain the result, the data at the output of the data slicer is passively monitored, accumulated, and filtered to calculate an adjustment to the current data slicer threshold.

Typically, the serial data input signal is in a non-return to zero (NRZ) format. However, other formats are possible. In some aspects of the system, not shown, a timing recovery circuit is used to generate a clock to sample and hold the received data. The sample input signal is synchronized to the center of the data bit.

Figure 4:
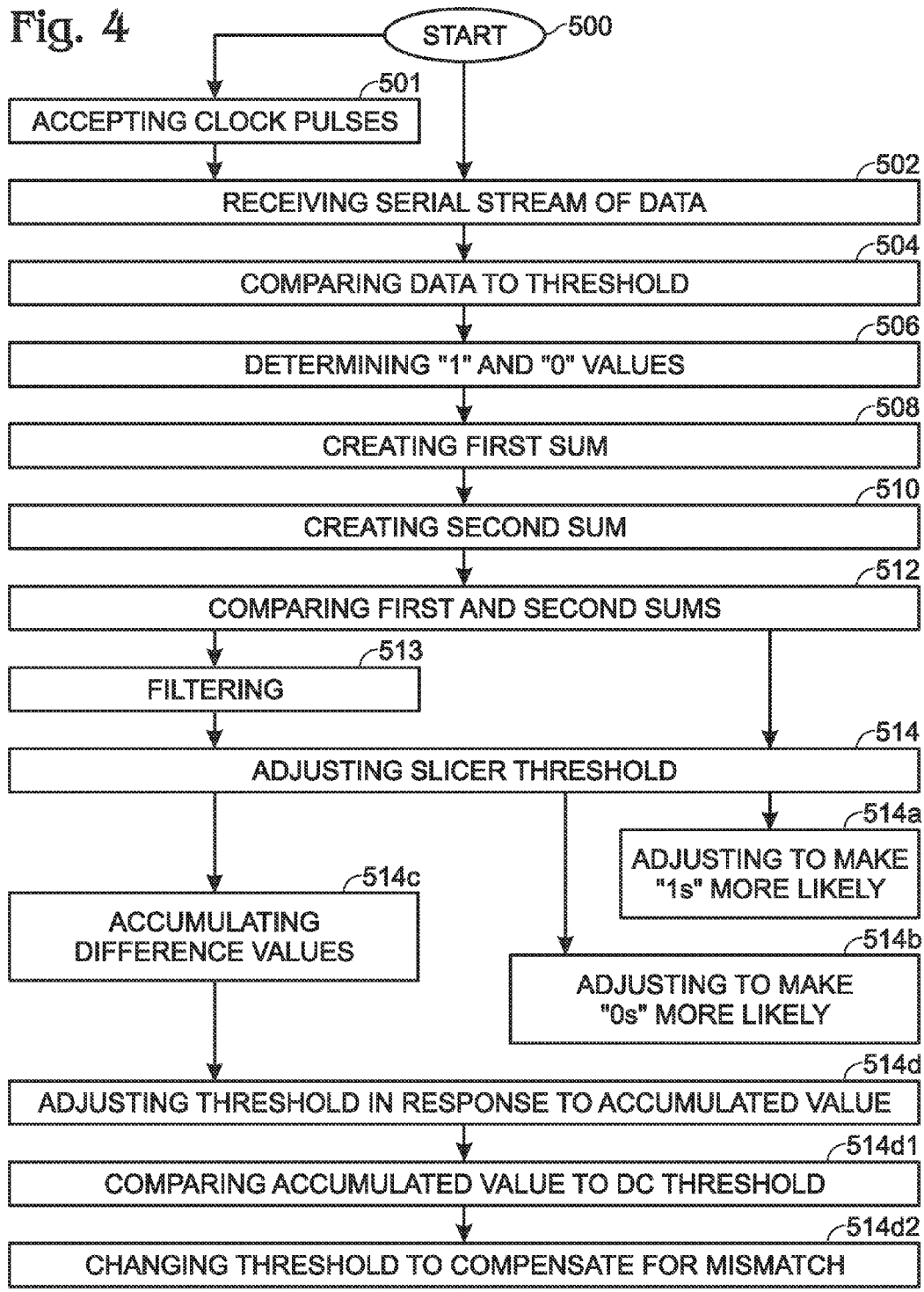
FIG. 4 is a flowchart illustrating a method for using disparity measurements to control the adjustment of a data slicer threshold.

FIG. 4 is a flowchart illustrating a method for using disparity measurements to control the adjustment of a data slicer threshold. These methods generally correspond to FIG. 3. Although this method is depicted as a sequence of numbered steps for clarity, no order should be inferred from the numbering unless explicitly stated. It should be understood that some of these steps may be skipped, performed in parallel, or performed without the requirement of maintaining a strict order of sequence. The methods start at Step 500.

Step 502 receives a serial stream of pseudorandom digital data signals having an average DC value. Step 504 compares data signal amplitudes to a slicer threshold value. In one aspect, Step 501 accepts clock pulses and comparing data signal amplitudes to the threshold value in Step 504 includes timing the comparison of data signal amplitudes to the threshold value in response to the clock pulses. In response to the slicer threshold value comparison, Step 506 determines data signal "1" and "0" values. Step 508 creates a first sum of determined "1" values. Step 510 creates a second sum of determined "0" values. Step 512 compares the first sum to the second sum. Step 514 adjusts the slicer threshold value in response to the comparison of the first and second sums.

In one aspect, adjusting the slicer threshold value in response to the comparison of the first and second sums (Step 514) includes substeps. Step 514*a* adjusts the slicer threshold value to make the determination of "1" values more likely in response to the second sum being larger than the first sum. Step 514*b* adjusts the slicer threshold value to make the determination of "0" values more likely in response to the second sum being smaller than the first sum.

In another aspect, comparing the first sum to the second sum in Step 512 includes subtracting the second sum from the first sum after the determination of each data value, creating a difference value. Then, adjusting the slicer threshold value in response to the comparison of the first and second sums includes other substeps. Step 514*c* accumulates the difference values, creating an accumulated value, and Step 514*d* adjusts the slicer threshold value in response to the accumulated value. Optionally, Step 513 low pass filters the difference value.

In another aspect, accumulating the difference values (Step 514*c*) includes accumulating difference values over a predetermined unit of time. Then, adjusting the slicer threshold value in response to the accumulated value (Step 514*d*) includes substeps. Step 514*d*1 compares the accumulated difference value to a DC input target threshold (DC threshold). For example, the DC threshold may he stored as a two's-complement signed value in a control register. Step 514*d*2 changes the slicer threshold value to compensate for a mismatch between the accumulated difference voltage and DC threshold. For example, Step 514*d*2 changes the slicer threshold value once every unit of time.

A system and method has been provided for using disparity measurements to control the adjustment of a data slicer threshold. Examples have been given of particular modulation and communication protocols, however, the principles of the present invention can he applied to any signal where ISI is an issue. Other variations and embodiments of the invention will occur to those skilled in the art.

We claim:

1. A method for using disparity measurements to control the adjustment of a data sheer threshold, the method comprising:
   receiving a serial stream of pseudorandom digital data signals having an average DC value;
   comparing data signal amplitudes des to a slicer threshold value;
   in response to the slicer threshold value comparison, determining data signal "1" and "0" values;
   creating a first sum of determined "1" values;
   creating a second sum of determined "0" values;
   comparing the first sum to the second sum by subtracting the second sum from the first sum after the determination of each data value, creating a difference value;
   adjusting the slicer threshold value in response to the comparison of the first and second sums;
      wherein adjusting the slicer threshold value in response to the comparison of the first and second sums includes:
         accumulating the difference values, creating an accumulated value; and,
         adjusting the slicer threshold value in response to the accumulated value.

2. The method of claim 1 wherein adjusting the slicer threshold value in response to the comparison of the first and second sums includes:
   adjusting the slicer threshold value to make the determination of "1" values more likely in response to the second sum being larger than the first sum; and,
   adjusting the slicer threshold value to make the determination of "0" values more likely in response to the second sum being smaller than the first sum.

3. The method of claim 1 further comprising:
   low pass filtering the difference value.

4. The method of claim 3 wherein accumulating the difference values includes accumulating difference values over a predetermined unit of time;
   wherein adjusting the slicer threshold value in response to the accumulated value includes:
      comparing the accumulated difference value to a DC input target threshold (DC threshold);
      changing the slicer threshold value to compensate for a mismatch between the accumulated difference voltage and DC threshold.

5. The method of claim 4 wherein changing the slicer threshold value to compensate for the mismatch between the accumulated difference voltage and DC threshold includes changing the slicer threshold value once every unit of time.

6. The method of claim 4 wherein, changing the slicer threshold value to compensate for the mismatch the accumulated difference voltage and the DC threshold includes comparing to a DC threshold stored as a two's-complement signed value in a control register.

7. The method of claim 1 further comprising:
   accepting clock pulses; and,
   wherein, comparing data signal amplitudes to the threshold. value includes timing the comparison of data signal amplitudes to the threshold value in response to the clock pulses.

8. In a communications receiver, a disparity measurement system for controlling the adjustment of a data slicer threshold, the system comprising:
   a comparator having an input for receiving a serial stream of pseudorandom digital data signals having an average DC value, an input to accept a slicer threshold value, and an output to supply data signal "1" and "0" values in response to comparing data signal amplitudes to the slicer threshold value;
   a first summing circuit having an input connected to the comparator output, and an output to supply a first sum of determined "1" values;
   a second summing circuit having an input connected to the comparator output, and an output to supply a second sum of determined "0" values;
   a subtractor having inputs connected to the first and second summing circuit outputs, and an output to supply a difference between the first and second sums; and,
   a threshold adjust module having an input to accept the difference and an output to supply the slicer threshold value responsive to the difference.

9. The system of claim 8 wherein the subtractor supplies a first difference in response to the second sum being larger than the first sum; and,
   wherein the threshold adjust module accepts the first difference and adjusts the slicer threshold value to make the determination of "1" values more likely.

10. The system of claim 9 wherein the subtractor supplies a second difference in response to the first sum being larger than the second sum; and,
    wherein the threshold adjust module accepts the second difference and adjusts the slicer threshold value to make the determination of "0" values more likely.

11. The system of claim 8 wherein the subtractor supplies a difference value, which is the difference between the first sum and the second sum, after the determination of each data value by the comparator.

12. The system of claim 11 wherein the threshold adjust module accumulates the difference values over a predetermined unit of time, creating an accumulated value, and adjusts the slicer threshold value in response to the accumulated value.

13. The system of claim 12 further comprising:
low pass filter interposed between the output of the subtractor and the input of the threshold adjust module.

14. The system of claim 13 further comprising:
a control register for storing a DC input target threshold (DC threshold); and,
wherein the threshold adjust module has an interface to access the DC threshold from the control register, the threshold adjust module comparing the accumulated difference value to the DC threshold and changing the slicer threshold value to compensate for a mismatch between the accumulated difference voltage and DC threshold.

15. The system of claim 14 wherein the threshold adjust circuit changes the slicer threshold value once every unit of time.

16. The system of claim 14 wherein the control register stores the DC threshold as a two's-complement signed. value.

17. The system of claim 8 wherein the comparator has a clock input to accept clock pulses, the comparator timing the comparison of data signal amplitudes to the threshold value in response to the clock pulses.

* * * * *

UNITED STATES PATENT AND TRADEMARK OFFICE
CERTIFICATE OF CORRECTION

| | | |
|---|---|---|
| PATENT NO. | : 8,218,685 B2 | Page 1 of 1 |
| APPLICATION NO. | : 12/414480 | |
| DATED | : July 10, 2012 | |
| INVENTOR(S) | : Sean Campeau | |

It is certified that error appears in the above-identified patent and that said Letters Patent is hereby corrected as shown below:

In Claim 1, column 5, line 39, the word "des" has been incorrectly inserted between the words "amplitudes" and "to" The term "des" should be removed.

In Claim 16, column 8, line 5, a "." has been incorrectly inserted between the word "signed" and the word "value". The "." should be removed.

Signed and Sealed this
Twenty-eighth Day of August, 2012

David J. Kappos
*Director of the United States Patent and Trademark Office*